(12) United States Patent
Strubbe

(10) Patent No.: US 6,272,935 B1
(45) Date of Patent: Aug. 14, 2001

(54) APPARATUS FOR MASS FLOW MEASUREMENT

(75) Inventor: Gilbert J. I. Strubbe, Loppem (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/586,997

(22) Filed: Jun. 5, 2000

Related U.S. Application Data

(62) Division of application No. 09/005,095, filed on Jan. 9, 1998.

(51) Int. Cl.⁷ ........................................................ G01F 1/30
(52) U.S. Cl. .................................................... 73/861.73
(58) Field of Search ..................... 73/861.73, 861.71, 73/861.72, 861

(56) References Cited

U.S. PATENT DOCUMENTS 4,480,947 * 11/1984 Nagasaka ............................ 406/14
5,121,638 * 6/1992 Gmur .................................... 73/861
5,561,250 * 10/1996 Myers ............................. 73/861.73
5,970,802 * 10/1999 Strubbe .......................... 73/861.73

* cited by examiner

Primary Examiner—Benjamin R. Fuller
Assistant Examiner—Jewel V. Thompson
(74) Attorney, Agent, or Firm—J. William Stader; Larry W. Miller

(57) ABSTRACT

In the field of mass flow measuring apparatuses, there is a need for greater accuracy of known devices. The invention concerns an impeller for projecting bulk material that otherwise might fail to contact a mass flow measuring apparatus during normal use. The impeller includes a surface inclined relative to a locus of its travel, whereby centrifugal forces cause granular material engaged by the surface to rise to a peripheral zone for projection towards a sensor member.

The invention also relates to a radar doppler speed measuring apparatus for use in mass flow sensors; to methods and apparatuses for compensating for longitudinal inclination of mass flow sensor members; and to methods and apparatuses for calibrating such devices.

5 Claims, 5 Drawing Sheets

APPARATUS FOR MASS FLOW MEASUREMENT

This is a divisional of co-pending application Ser. No. 09/005,095 filed on Jan. 9, 1998.

BACKGROUND OF PRIOR ART

1. Field of Art

This invention relates to improvements in or relating to mass flow measurement, which is the measurement of the mass flow rate of so-called "bulk" materials. Such materials include but are not limited to grain, forage, granular chemicals, powders, fruit, vegetables, coal, minerals, ores and high viscosity liquids. The invention has particular application to the measurement of the mass flow rate of grain to the grain tank of a combine harvester.

2. Background of Prior Art

It is known to provide a mass flow measuring apparatus including a sensor member having a surface along which the streamline flow of bulk material may occur thereby giving rise to forces, moments or torques in the sensor member that are measurable. Strain gauges, optical displacement sensors, ring dynamometers and torque meters can be used to produce electrical signals indicative of the magnitudes of the forces, moments or torques, thereby providing an indication of the mass flow rate of bulk material.

Co-pending European Patent Application No. 96201889.1 discloses a method and apparatus for rendering the measurements of mass flow rate measuring apparatuses more accurate, by substantially eliminating the effects of changes in the coefficient of friction ($\mu$) between the bulk material and the sensor surface on the measured mass flow rate values. Nonetheless, there is scope for improvement of the accuracy of such measuring apparatuses, as detailed below.

Furthermore, there are additional kinds of mass flow rate measuring apparatuses that rely on the establishment of impulse forces on a sensor plate, instead of the establishment of streamline flow. Such impulse type measuring apparatuses are believed to be less accurate than the streamline flow type. Thus there is a greater need for improving the accuracy of such apparatuses.

Mass flow measuring apparatuses may be employed in grain and chemical hoppers, railway tankers and waggons, silos and crop harvesting machines such as combine harvesters.

In combine harvesters it is highly desirable to know the rate at which crop grains are filling the grain tank of the harvester during harvesting operations. It has been proposed to use the streamline flow type mass flow measuring apparatuses in combine harvesters. It is essential in such apparatuses to know the velocity of grain at the start of its travel along the sensor surface.

It has been proposed to locate the sensor surface at the top of the grain elevator leading from the threshing mechanism of the combine harvester to the base of the so-called "bubble up" auger that feeds grain into the grain tank. The grain elevator is a paddle-type device having a series of shaped paddles or buckets mounted on an endless drive chain or other flexible member that is powered at a constant speed from the engine of the vehicle. The flexible chain extends substantially vertically over the majority of its length, and is positioned such that the paddles or buckets repeatedly pick up quantities of grain at a low level in the cleaning area below the threshing area of the combine harvester and raise them to the bubble up auger. The motion of the grain elevator is such as to throw the quantities of grain clear of the paddles, towards the bubble up auger, when they reach the correct height.

Previous proposals for mass flow measuring apparatuses involve locating a sensor surface so that it forms part of the path of the grains between the paddles at the top of the elevator and the base of the bubble up auger. Thus it is possible to establish streamline flow of grains on the sensor surface by guiding the projected grains (via a further surface at a tangent to the end of the sensor surface) to the end of the sensor surface.

Generally, the sensor surface lies above the grains for the greater part of their travel therealong, the forces, moments or torques in the sensor member being generated principally by centrifugal forces transmitted from the grains to the surface: and by the effects of friction between the gains and the material of the sensor surface.

Since each paddle or bucket on the grain elevator contains grain to a depth of several centimeters, it will be appreciated that not every grain from a paddle or bucket on the elevator is projected at the same velocity and with the same momentum. Thus some of the grains fail to reach the sensor member and tend to fall downwardly beside the grain elevator. Such grains may fall to the bottom of the conveyor housing and add to the volume of freshly threshed grain. Eventually, recurrently recycled grains become milled between the moving components and the walls of the conveyor.

The grains that fall away from the sensor member can lead to inaccuracies in the measured flow rate.

SUMMARY OF THE INVENTION

According to a first aspect of the invention there is provided an impeller apparatus for bulk material, comprising a material engaging portion having a surface including a root zone and a peripheral zone, the surface being movable along a locus whereby to impart a peripherally directed force to bulk material engaged by the surface; and a drive for driving the surface at a predetermined speed along the locus; the surface being so inclined relative to at least one point on the locus that bulk material engaged by the surface moves towards the peripheral zone when the surface passes the or each such point at least the predetermined speed, thereby permitting projection of bulk material from the impeller.

In preferred embodiments of the invention, the impeller is located to engage, energise and re-project those grains as referred to above that are of low momentum and therefore either fail to contact the sensor surface or contact the sensor surface for only a part of its length.

The apparatus of the invention thus advantageously reduces the wastage of grains in a combine harvester and also renders the measurements of a mass flow measuring apparatus more accurate.

The invention is also considered to reside in a mass flow measuring apparatus including an impeller as defined herein. Preferably, the impeller assists a conveyor in conveying bulk material to a sensor member.

In particularly preferred embodiments the mass flow measuring apparatus includes means for matching the speed of ejection of bulk material from the impeller to the speed of conveyance of bulk material by the conveyor. In the case of the impeller being rotatable, this is readily achieved by means of a gearing system that matches the speed of the periphery of the impeller surface to the speed of grains or other bulk material conveyed by the outer portions of the conveyor paddles or buckets.

When the mass flow measuring apparatus is embodied in a combine harvester, the speed of bulk material in the conveyor is essentially the same as the speed of bulk material at the time of its projection from the paddles or buckets of the grain elevator.

Preferably the mass flow measuring apparatus includes a speed sensor for sensing the speed of the bulk material near the outlet of the conveyor.

The sensor may also optionally include a guide surface for bulk material, the guide surface being spaced from the impeller by a distance approximately equal to the depth of bulk material conveyed by the conveyor, whereby bulk material projected from the impeller joins bulk material ejected from the conveyor at approximately the height of the free boundary of such material. Thus the impeller augments the operation of the conveyor without causing plugging or choking of the path of bulk material, e.g. along the sensor member.

In streamline flow sensor apparatuses, it is essential to know the speed at which bulk material is ejected from the paddles of the elevator, since such data provides the start velocity of grains at the beginning of their travel along the sensor member. This in turn is vital in the calculation of the mass flow rate of bulk material from the forces, moments or torques generated in and measured by the sensor member.

Also, of course, the above-mentioned matching of the speed of ejection of bulk material from the peripheral zone of the impeller and the speed of bulk material ejected from the grain elevator can readily be achieved if the speed of conveyance of bulk material in the conveyor, or immediately after projection from the paddles or buckers is accurately known.

It has previously been proposed to employ opto-sensors for measuring the speed of bulk material in the grain elevator of a combine harvester. The opto-sensor apparatus comprise a series of emitter-receiver pairs disposed on opposite sides of the path of travel of the paddles or buckets. The opto-sensors detect the upper free boundary of each quantity of bulk material in the paddles or buckets. The time taken for the upper free boundary of such a quantity of bulk material to pass from one sensor pair to a subsequent sensor pair in the elevator can be used as an indication of the speed of the conveyor and hence of the bulk material therein. The outputs of the opto-sensors can also establish a crude volumetric flow rate measurement.

However, the use of opto-sensors in conveyor elevators is associated with significant disadvantages.

Firstly the outputs of the opto-sensors relate only to the condition of the bulk material in the vicinity of the emitter-receiver pairs. Thus if grain falls off a paddle or bucket or settles in the paddle/bucket during its travel between consecutive emitter-receiver pairs, the accuracy of the speed measurement is lessened by virtue of the change in profile of the free boundary of the quantity.

Also, perturbations of the quantities can arise from changes in the orientation of the elevator. This occurs in combine harvesters as they travel along rows of crop in a field. The perturbations lead to changes in the profile of the free boundary of each grain quantity in the elevator, again reducing the accuracy of measurement.

The opto-sensor pairs also are susceptible to error since in use of a combine harvester they become dirty and hence unreliable.

Thus there is a significant need for a speed sensing apparatus for use in conjunction with mass flow measuring devices that are suitable for incorporation in combine harvester elevator sections.

According to a third aspect of the invention there is provided a speed sensor for bulk material in a conveyor, the speed sensor comprising a radar doppler effect sensor.

Preferably the sensor includes an emitter-receiver capable of transmitting a signal to bulk material in a conveyor and receiving a frequency- and/or wavelength-shifted signal reflected from the bulk material, the shifting of the frequency and/or wavelength of the signal being proportional to the speed of bulk material adjacent the outlet of or on the conveyor.

An advantage of this arrangement is that the speed signal is not dependent on the profile of the free boundary of grains in a paddle or bucket, since the speed measurement is effected on the grains themselves. Also it is not essential that the grains be resident in the paddle or bucket at the time the measurement is made. Indeed, it is desirable for the speed measurement in a combine harvester to occur at a point as close as possible to the start of the sensor member of the mass flow measuring device.

In this connection, the emitter-receiver of the doppler effect sensor may advantageously be set into the surface of a guide member lying at a tangent to the end of the sensor member of the mass flow measuring apparatus, whereby to measure the speed of the grains at a point just prior to their travel along the sensor member. The grains tend to clean the surface of the guide member and the sensor member, thereby obviating the problem of dust and other contaminants that arises when opto-sensor pairs are used in the vicinity of the elevator paddles or buckets.

Changes in the orientation of a combine harvester can significantly influence the effects of gravitational forces on the forces, moments and torques experienced by the sensor member of the mass flow measuring apparatus.

According to a fourth aspect of the invention, there is provided a mass flow measuring apparatus for bulk material comprising a sensor member having a surface permitting movement thereon of bulk material whereby to generate a force, moment or torque in dependence on the mass of bulk material moving on the sensor member per unit time; and a signal generator for generating a measurement signal indicative of the force, moment or torque, the mass flow measuring apparatus including means for compensating for the effects on the magnitude of the force, moment or torque of inclination of the surface relative to a predetermined orientation.

The means for compensating may be embodied in a number of ways.

The most preferred embodiment of the means for compensating includes an inclinometer capable of generating an inclination signal indicative of the inclination of the surface relative to the predetermined orientation, the mass flow measuring apparatus including a signal processor for combining the measurement and inclination signals whereby to compensate for inclination of the surface.

One formula by which the measurement and inclination signals may be combined to compensate for inclination is as follows:

$$Q = A.(V - V_0).(1 - B.\Delta\delta)$$

wherein:

Q is mass flow rate of bulk material on the surface;

$\Delta\delta$ is the inclination signal;

V is the measurement signal at an inclination $\Delta\delta$ of the surface;

$V_0$ is the measurement signal at Q-0 and $\Delta\delta=0$; and

A and B are constants of the mass flow measuring apparatus.

In particularly preferred embodiments the inclinometer is configured to detect inclination of the sensor in the direction of movement of bulk material thereon. This feature is advantageous because the longitudinal axis of the sensor member of the mass flow measuring apparatus is in a combine harvester generally aligned with the longitudinal axis of the vehicle, in which longitudinal inclination is likely to have a more significant effect on the forces, etc experienced by the sensor member. An inclinometer that detects such longitudinal changes in orientation is therefore capable of compensating for the majority of the inaccuracy caused by changes in orientation in a single calculation step.

Nonetheless, inclinometers designed to detect inclination in directions other than the longitudinal direction of the sensor surface are also considered to be within the scope of the invention.

As an alternative to the use of an inclinometer to provide a correction factor for measured mass flow rate values, it is optionally possible to provide a counterweight for a sensor member secured for pivoting movement in the mass flow measuring apparatus. The purpose of the counterweight is to cause the centre of mass of the sensor member plus counterweight combination to lie at the point of pivoting of the sensor member, thereby theoretically eliminating the influence of changes in the orientation in at least one direction. In preferred embodiments the position of the mass may be adjustable, e.g. by virtue of a solenoid actuator and a control device, in dependence on the angle of inclination of the surface relative to a predetermined orientation.

In practice, of course, the use of a mass in this way represents a compromise since in practical use of a combine harvester the sensor member is subjected to impulses of varying frequencies, magnitudes and directions. For this reason, the use of an inclinometer permitting correction of the measured mass flow rate values in real time is preferred.

A further disadvantage of previous mass flow measuring technology in combine harvesters concerns the need for calibration, and frequent re-calibration, of the apparatuses. Such re-calibrations are cumbersome since they generally require integration of the mass flow signal until sufficient grain is harvested to fill a trailer or waggon, followed by weighing of the trailer or waggon to establish the true mass of grain. This value is loaded into the memory of the apparatus as a calibration value.

One particular problem is that of changes in the coefficient of friction between the crop grains and the material of the sensor member surface causing changes in the forces, moments and torques experienced by the sensor member.

According to a fifth aspect of the invention there is provided a mass flow measuring apparatus for bulk material comprising a sensor member having a surface permitting movement thereon of bulk material whereby to generate a force, moment or torque in dependence on the mass of bulk material moving on the sensor member per unit time; and a signal generator for generating a measurement signal indicative of the force, moment or torque, the mass flow measuring apparatus including means for applying a predetermined force to the surface for calibration of the measurement signal.

One preferred way of applying a known force to the surface involves applying a known mass subject to gravity to the sensor member. Equally preferable are resiliently deformable members engageable with the sensor member whereby to apply the predetermined force; and a powered actuator for engaging the sensor member with the predetermined force.

The powered actuator may be solenoid actuated.

Any of the means for applying a predetermined force to the sensor member may be permanently installed within the combine harvester or may be applied only when conducting an initial calibration, e.g. during construction of the vehicle. This latter possibility is likely to be more suitable for sensor members that are substantially optimised with respect to changes in $\mu$, as described in European Patent Application No. 96201889.1.

According to a sixth aspect of the invention, there is provided a method of calibrating a mass flow measuring apparatus comprising a sensor member having a surface permitting movement thereon of bulk material whereby to generate a force, moment or torque in dependence on the mass of bulk material moving on the sensor member per unit time; and a signal generator for generating a measurement signal indicative of the force, moment or torque, the method comprising the steps of:

(i) assigning a value equivalent to a zero mass flow to the measurement signal arising when the sensor member experiences no force, moment or torque;

(ii) applying a known force to the sensor member; and (iii) assigning a value, equivalent to the mass flow rate of bulk material on the surface corresponding to the known force, to the measurement signal arising during application of the known force, thereby permitting subsequent assignment of values, equivalent to further mass flow rates of bulk material on the surface, to further measurement signals generated by the signal generator.

This method advantageously is quick and simple to carry out.

Optionally, steps (ii) and (iii) of the method may be repeated using further, known forces. Such additional steps would be warranted when it is suspected that the calibration curve of the sensor member is non-linear.

BRIEF DESCRIPTION OF THE DRAWINGS

There now follows a description of preferred embodiments of the invention, by way of example, with reference being made to the accompanying drawings in which.

DETAILED DESCRIPTION OF THE INVENTION

Figure 1:
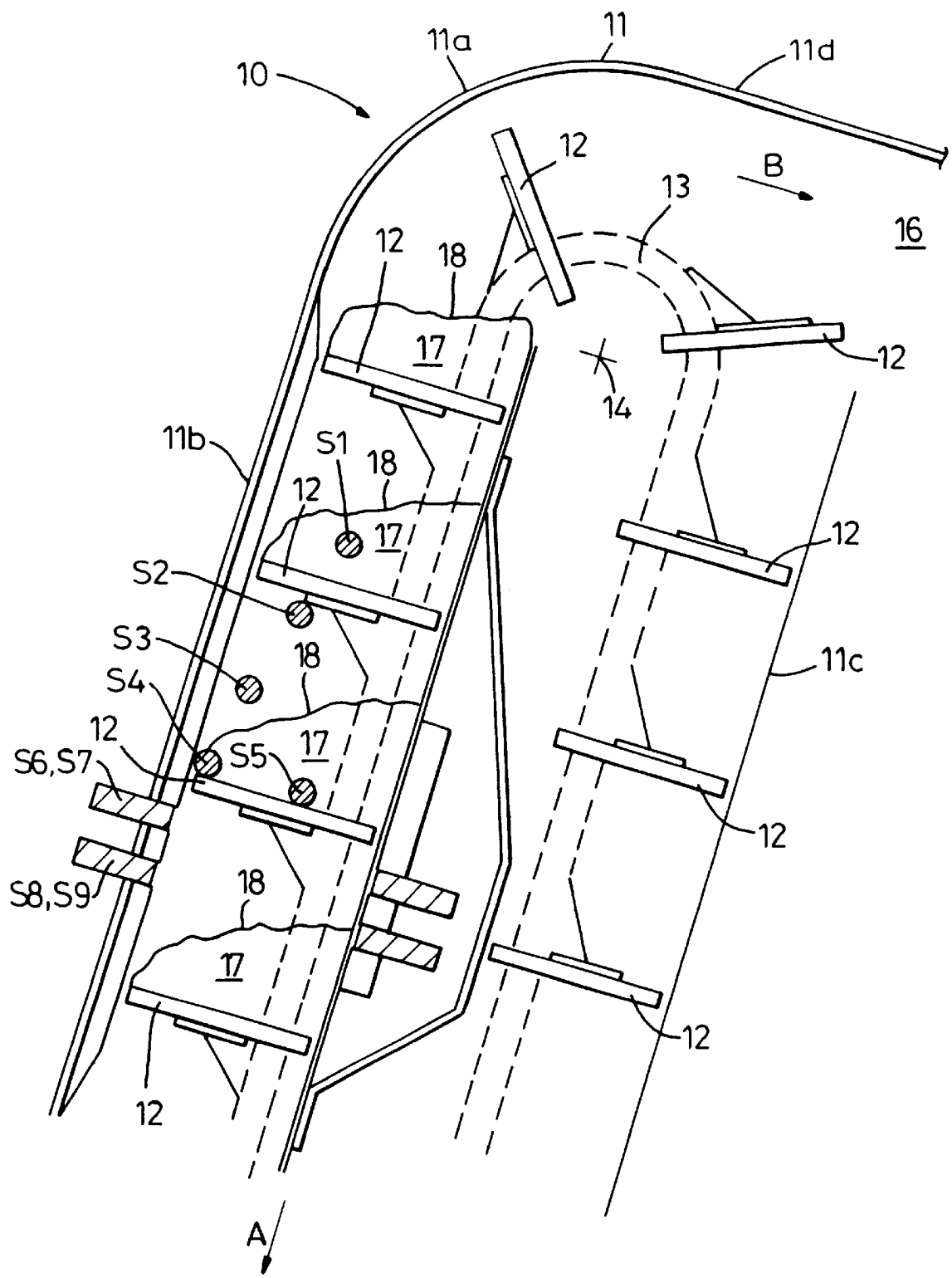
FIG. 1 is a side elevational view of a prior art grain elevator of a combine harvester showing the use of an opto-sensor volume flow rate measuring apparatus.

Referring to FIG. 1, there is shown a prior art grain elevator 10 having an outer casing 11 shaped as a generally elongate, rectangular section tube having a rounded corner portion 11a at its upper end.

Only the side walls 11b, 11c and the top wall 11d of housing 11 are visible in FIG. 1. Nonetheless, housing 11 defines a generally enclosed, elongate hollow structure that is inclined at an angle of approximately 15° to the vertical.

The lower end of elevator housing 11 (not visible in FIG. 1 but indicated generally by the arrow A) extends into the threshing area of the combine harvester. Elevator 10 functions to raise clean grain within the combine harvester by virtue of a series of paddles 12 mounted on an endless, flexible drive belt 13 forming an elongate loop extending from the bottom of the elevator 10 to the top thereof visible in FIG. 1.

The drive belt 13 is driven by a drive wheel (not shown) the axis 14 of which is visible in FIG. 1. The drive wheel is powered from the engine of the combine harvester and rotate at a constant speed to drive the flexible belt 13 continuously while the combine harvester is in operation.

The flexible belt 13 thus drives the paddles along an elliptical locus that takes them into the clean grain trough below the cleaning mechanism to pick up grain, upwardly to the top of elevator 10 where the grain is discharged in a manner described below and down the opposite side of the grain elevator 10 in order to collect further grain from delivered to the cleaning mechanism from the thresher.

As is clear from FIG. 1, in the upper extremity of the grain elevator 10 the paddles follow an arcuate path. The speed of the paddles is sufficient to throw grain outwardly in the direction of arrow B of FIG. 1. The grain passes via an outlet aperture 16 of the elevator 10 to the base of the bubble up auger that further elevates the grain to the grain tank of the combine harvester.

As illustrated in FIG. 1, the quantities of grain picked up by the paddles at the bottom part of their travel, through the grain cleaner, are not uniform. The shapes of the free boundaries 18 of the portions 17 vary from one paddle to the next. Thus the volume of grain conveyed by each paddle is different.

The prior art embodiment of FIG. 1 includes a series of opto-sensor pairs S1–S9 shown schematically in the drawing figure. The opto-sensors pairs S1–S5 are aligned to detect the heights of the grain portions 17 in a direction generally orthogonal to the direction in which the opto-sensor pairs S6–S9 also detect the heights of the portions 17.

The various sensor pairs can be used to generate signals indicative firstly of the height of the free boundary 18 of each grain portion 17; and also (by virtue of the frequency with which the free boundaries 18 pass selected, spaced opto-sensor pairs such as S4 and S1 during ascent of the loaded paddles 12), the velocity of the grain on the conveyor.

Nonetheless, the prior art device is subject to numerous disadvantages as set out hereinabove. In particular, the variations in the heights of the free boundaries 18 render the measurements by the opto-sensor pairs somewhat inaccurate. Also, of course, the opto-sensor pairs erroneously measure grain in the elevator that fails to reach the base of the bubble up auger following ejection via the outlet 16.

Furthermore, the combine harvester suffers various, unpredictable, pronounced perturbations during use, by virtue e.g. of undulations of the field in which it operates, changes in direction occasioned by the operator of the combine harvester and so on. Such perturbations are generally sufficiently pronounced that the profiles of the free boundaries 18 of the grain portions 17 are likely to change during conveyance of the grain portions up the elevator 10.

Figure 2:
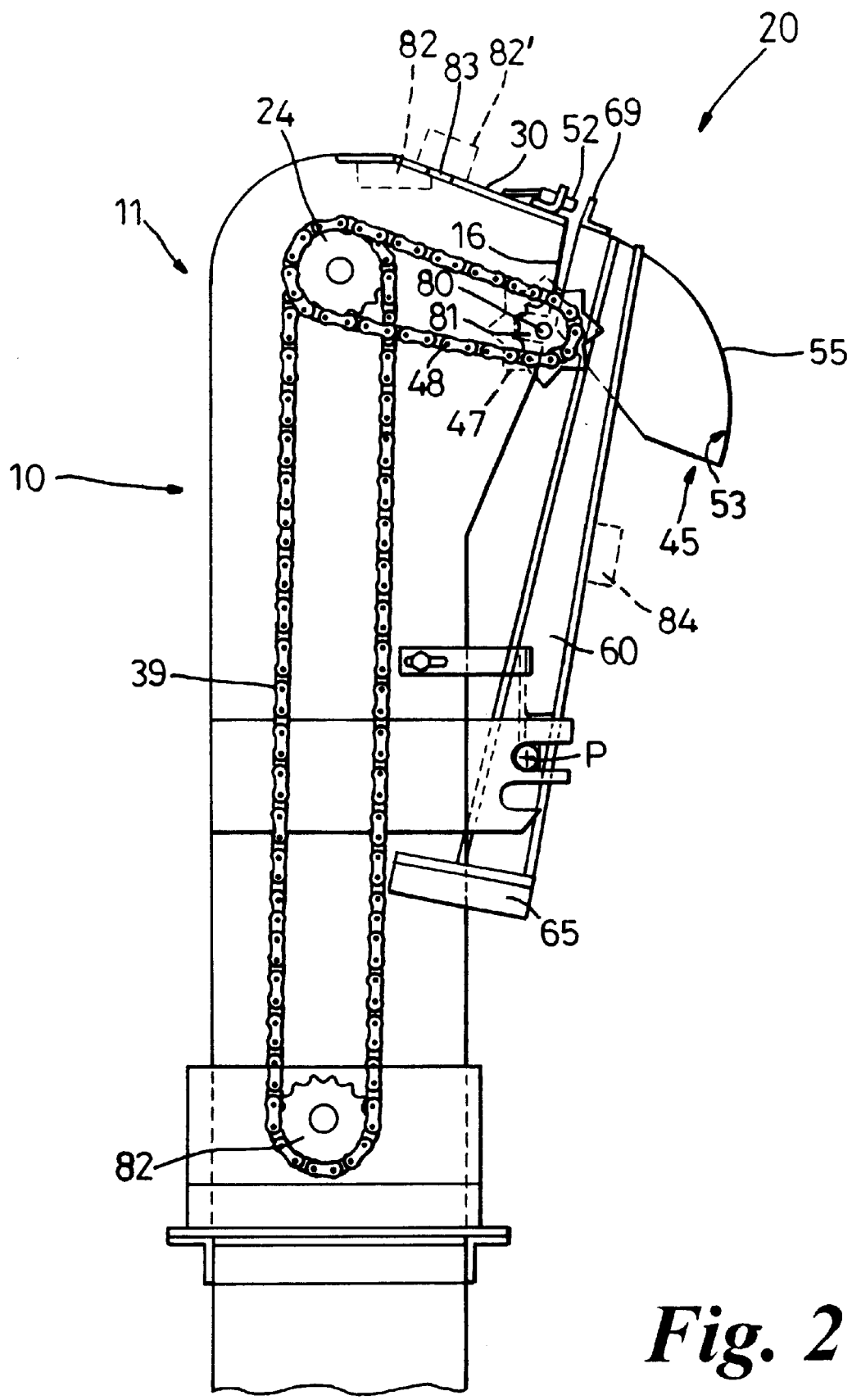
FIG. 2 shows part of a grain elevator illustrating some of the principles of the invention.

Referring now to FIG. 2, there is shown in schematic form a grain elevator 10 according to the invention, having associated therewith a mass flow measuring apparatus 20 of the general kind disclosed in European Patent Application No. 96201889.1.

The paddles 12 and drive belt 13 of FIG. 1 are omitted from FIG. 2 for clarity.

Mass flow measuring apparatus 20 is secured at the outlet 16 of housing 11. Measuring apparatus 20 includes sensor member 55 having sensor surface 53. Sensor member 55 is mounted for pivoting movement about pivot point P by virtue of support arm 60.

A displacement sensor 52,69 sense displacement of sensor member 55 relative to e.g. outlet 16 and generates a signal proportional thereto. As explained in European Patent Application No. 96201889.1 the displacements of sensor member 55 are proportional to the moments about pivot P generated by the flow of grain along surface 53. The moment at any given instant is proportional to the contemporaneous mass flow rate of grain.

In the embodiment shown in FIG. 2 the base of the bubble up auger is located beneath the outlet area of sensor member 55 indicated generally by reference numeral 45.

Figure 3:
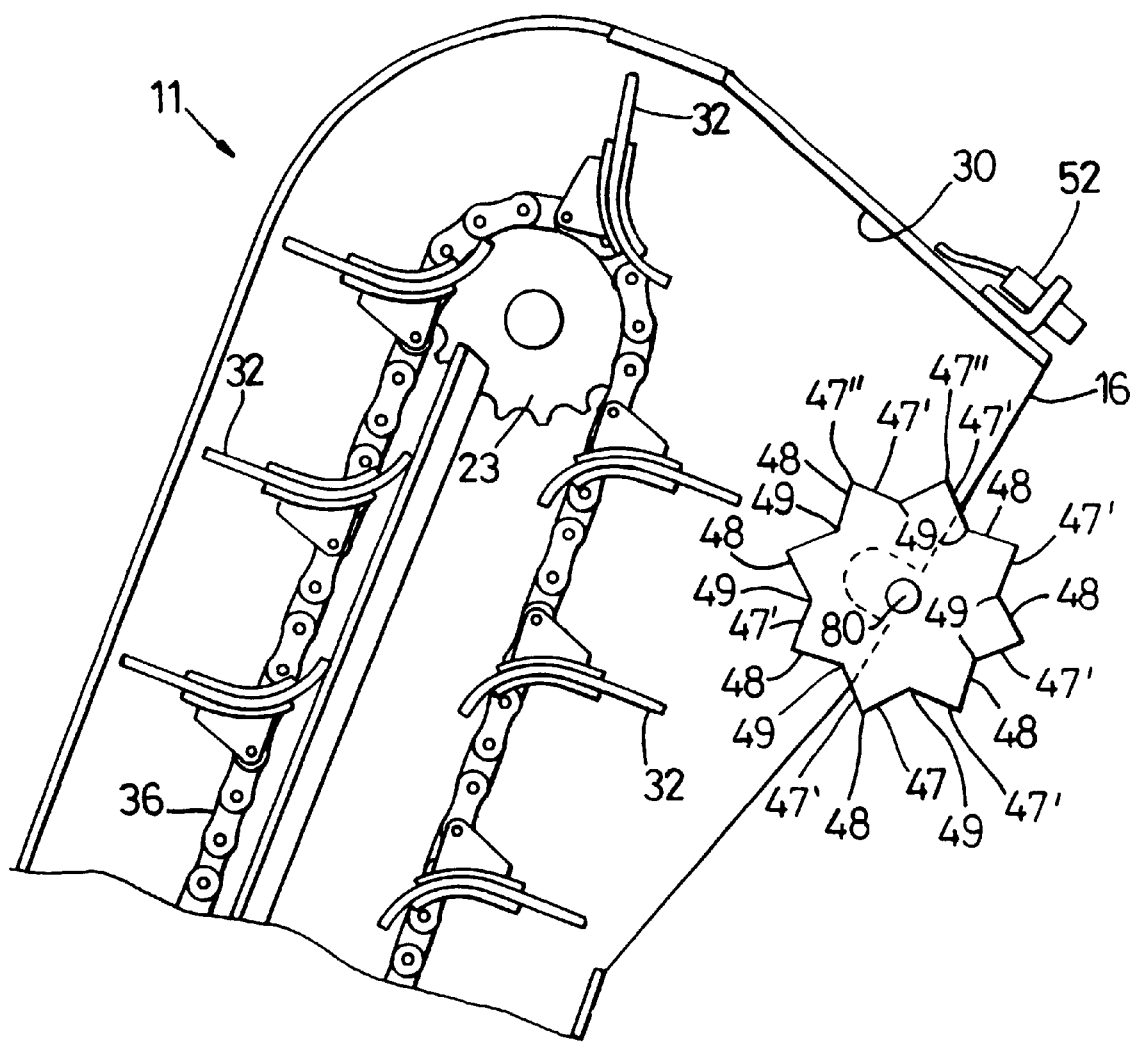
FIG. 3 is a view, similar to FIG. 2, showing further features in accordance with the invention.

FIGS. 2 and 3 show an impeller in the form of a star wheel 47, mounted for rotation about a shaft 80, at the base of the outlet portion 16 of housing 11. As is shown most clearly in FIG. 3, star wheel 47 comprises a series of material engaging portions each including a surface 47'. Star wheel 47 substantially spans the width of outlet 16.

As best shown in FIG. 2, shaft 80 is drivingly engaged with a sprocket 81 driven by endless chain 48 that is wrapped around further sprocket 24, aligned with and laterally spaced from sprocket 23 at the top of grain elevator 10.

Sprocket 23 is mounted on a common shaft with a further sprocket (not visible in FIG. 2) for co-rotation therewith. Sprocket 23 is driven at a constant speed by virtue of further endless chain 39 extending in a longitudinal loop within elevator 10. The lower end of chain 39 is drivingly wrapped around yet a further sprocket 82 driven at a constant speed by the engine of the combine harvester.

Sprocket 82 also provides drive to a further endless chain 36 on which the paddles 32 best shown in FIG. 3 are mounted for movement within the grain elevator 10. The sizes of the various sprockets are chosen to ensure that the speed of the outer, peripheral portion 47" of each surface 47' of star wheel 47 is matched to the speed of the outer portion of each paddle 32 as it passes around sprocket 23 at the top of grain elevator 10 and discharges grain towards outlet 16.

Since star wheel 47 is rotatably mounted on shaft 80, the locus of each surface 47' is a circle. Each surface 47' is permanently at an angle to the line of the locus of the impeller. The angle of inclination of each surface 47' to the locus is chosen such that a particle of bulk material at any point on a surface 47' moves under centrifugal force towards the peripheral zone 47" when the star wheel 47 rotates at the speed of the paddles 32. Indeed, the angle of inclination of surface 47' is such that virtually all grains landing on each surface 47' reach the peripheral zone 47" within a few degrees of rotation of star wheel 47. Thus such grains are projected clear of the star wheel 47 towards aperture 16, where they join the majority of grains previously projected from the paddle 32.

A wall 48 interconnects each peripheral zone 47" and the root zone 49 of the rearwardly adjacent surface 47'. Wall 48 is inclined to the locus of the wall 47' at a complementary angle to that of the wall 47', thereby completing the star wheel profile visible in FIG. 3. Thus grains of bulk material that fall onto the walls 48 are accelerated to the root zones 49 of the star wheel from where they experience centrifugal forces that drive them to the peripheral zones 47" for projection towards outlet 16.

The wall of housing 11 adjacent outlet 16 defines a guide surface 30 for the grains of bulk material projected from paddles 32 and the star wheel 47. The location of shaft 80, and the diameter of star wheel 47, are chosen such that the space between the peripheral zones 47" of the guide surface 30 is large enough to permit free, unchoked flow of granular material through outlet 16 yet sufficiently small to ensure that grains projected from the peripheral portions 47" join the main bulk of the flow through outlet 16.

Although the impeller is shown as star wheel 47 in FIG. 3, other shapes are possible. Also, of course, the loci of the surfaces 47' need not be circular. It is sufficient simply for the inclination of each surface 47' relative to the locus to be such as to cause grains of bulk material on the surfaces 47' (or if present, on the walls 48) to travel to the peripheral zones 47" for projection when the impeller 47 is driven at a predetermined speed.

FIG. 2 shows schematically (in dotted lines) a radar Doppler effect speed sensor for sensing the speed for granular material ejected from the paddles 32.

The dDoppler effect sensor 82 includes and emitter-receiver capable of transmitting a signal to the bulk material in the vicinity of the upper end of elevator 10 and receiving a wavelength-shifted signal reflected from the bulk material, the shifting of the wavelength of the signal being proportional to the speed of bulk material on the conveyor.

Numerous forms of radar Doppler effect sensor are known. These include sensors that generate an output signal proportional to the shifting of the wavelength, and hence proportional to the speed of the bulk material.

The speed sensor 82, or a control system for the apparatus of FIG. 2, may include a signal generator and/or signal processor for generating a signal indicative of the speed of bulk material. This signal may be input to a processor as the initial speed of bulk material on the surface 53 of sensor member 55, whereby to permit calculation of the mass flow rate of bulk material.

The output of speed sensor 82 may alternatively be used to correct for deviations, of the actual mass of grains projected from the conveyor, from the rated or nominal mass flow rate resulting from driving of the conveyor at a constant speed from the engine of the combine harvester. This may be achieved using the formula:

$$Q_{actual} = Q_{measured} * v_{0\ nominal} / v_{0\ actual},$$

in which:

$Q_{actual}$ is the corrected mass flow rate value;

$Q_{measured}$ is the uncorrected (measured) flow rate value output from the mass flow measuring apparatus;

$v_{0\ nominal}$ is the nominal speed of grains projected from the conveyor as a result of driving of the conveyor at a constant speed; and $v_{0\ actual}$ is the speed of the grains measured by the radar Doppler effect device.

Instead of being located on the inwardly directed face of surface 30, radar doppler effect speed sensor 82 may alternatively be mounted on the outer side of housing 11 as indicated by reference numeral 82', adjacent a window 83 through which the measuring signal of the sensor may be projected and received after reflection. This arrangement is particularly suitable for optical Doppler effect devices. The window 83 would be effectively self-cleaning, by virtue of the repeated contact of grains therewith. Therefore the problem of dirt clogging the optical sensing devices known in the prior art can be eliminated.

FIG. 2 also shows one form of device for compensating for the effect on the magnitude of the force, moment or torque experienced by the sensor member 55 of inclination of the surface 53 of sensor member 55 from a predetermined orientation.

This compensation means takes the form of counterweight 65 that lies at the free end of an extension of support arm 60 of sensor member 55. The extension projects beyond pivot point P so that counterweight 65 provides a moment about pivot point P acting to attenuate perturbations of sensor member 55. In other words, the counterweight 65 serves to displace the center of gravity of the sensor member from the pivot axis P. Thus in the no flow condition the sensor member 55 is substantially insensitive to changes in the orientation of the longitudinal axis of the combine harvester.

As an alternative to counterweight 65, and inclinometer shown schematically at 84 in FIG. 2 may be employed. The inclinometer 84 can be located at any point that moves with the sensor member 55, in order to measure the inclination of sensor member 55 in at least one direction, from a predetermined, initial orientation.

The inclinometer 84 generates a signal proportional to the inclination of sensor member 55. This signal may be fed to the processor calculating the mass flow rate of material on the sensor member 55, in order to correct the measured flow rate signal for inclination. The preferred formula for correction of the flow rate signal is:

$$Q = A.(V-V_0).(1-B.\Delta\delta)$$

wherein:

Q is mass flow rate of bulk material on the surface;

$\Delta\delta$ is the inclination signal;

V is the measurement signal at an inclination $\Delta\delta$ of the surface;

$V_0$ is the measurement signal at Q=0 and $\Delta\delta$=0; and

A and B are constants of the mass flow measuring apparatus that can be determined by appropriate testing.

Both embodiments of means for correcting the measured flow rate signal for inclination correct for changes in the inclination in the left to right (or right to left) direction of FIG. 2. It is believed that orientation correct changes in this direction are likely to have the most significant effect on the measured flow rate values.

However, it is conceivable to employ similar measures (in particular the inclinometer) effective to correct for changes in inclination in other directions if desired.

FIGS. 4a to 4d show further embodiments of the mass flow measuring apparatus of FIG. 2, in which the pivot point P is in each case disposed above the sensor member 53 via a suspension member 60. A shaft 61 extends to either side of pivot point P and engages a fixed part of the combine harvester for pivotable supporting of sensor member 55.

Member 60 extends upwardly above pivot point P to support counterweight 65 that in the FIG. 4 embodiments lies above pivot point P in order to counteract the effects of changes in the inclination of sensor member 55.

Each of the embodiments of FIGS. 4a–4d includes means for calibrating the mass flow measuring apparatus.

Figure 4A:
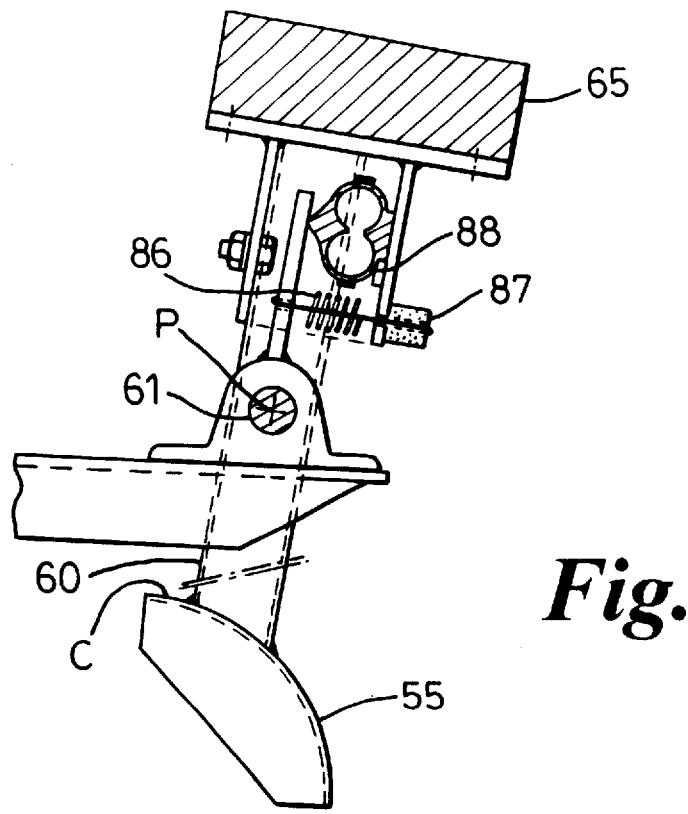
FIGS. 4a to 4d show further preferred embodiments of the invention.
Figure 4B:
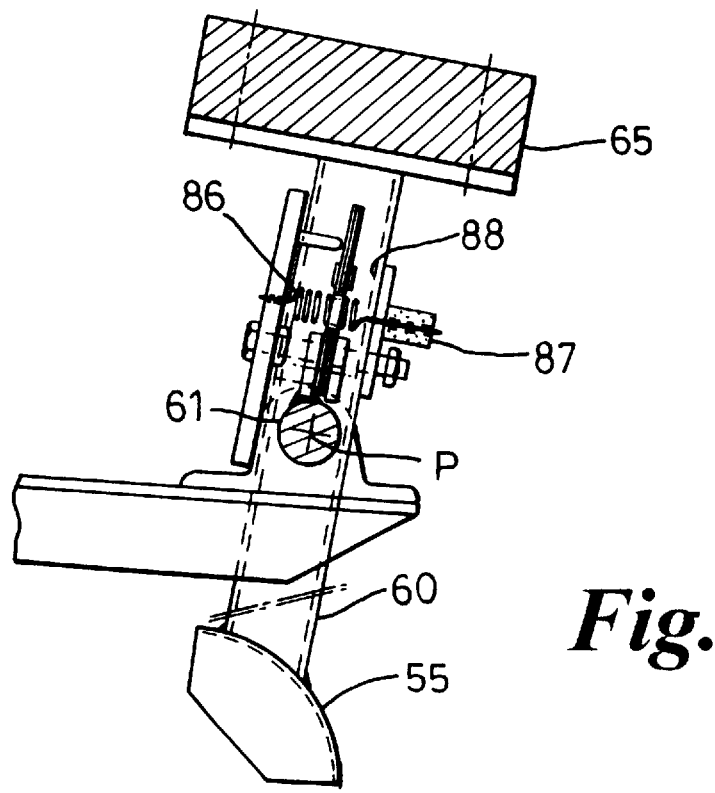

In FIGS. 4a and 4b, there is provided a calibration spring 86 interconnecting the support member 60 and a point fixed relative to surface 30. A linear solenoid actuator 87 is connected in series with the calibration spring such that on operation of actuator 87 calibration spring is moved into contact with a housing wall 88 so that spring 86 applies a known, predetermined force and moment or torque to support member 60.

This cause deflection of sensor member 55. Such deflection of sensor member 55 is detectable e.g. by means of sensor 52 (FIG. 2). Since the force applied by solenoid 87 and spring 86 is of a known magnitude, it may be used for calibration of the apparatus in a per se known manner once a second calibration reading is obtained, as described below.

A second calibration reading of sensor 52 may be obtained by switching off the calibration solenoid 87 so that the sensor 52 detects the position of the sensor member 55 in the no flow condition. This may be regarded as the deflection equivalent to a zero mass flow rate in the sensor member 55.

The two resulting calibration points may then be used, e.g. in a processor to ascribe the real time readings from sensor 52 to known mass flow rate values.

Figure 4C:
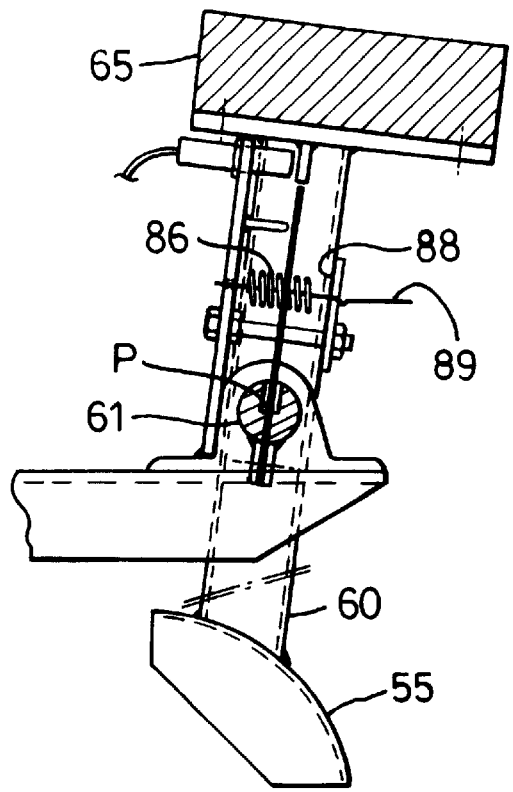

As an alternative to use of the solenoid and spring combination, a spring 86 alone may be employed, as shown in FIG. 4c. The application of a force from this spring involves manual intervention by pulling on actuator member 89 and therefore this arrangement is primarily suited to calibration of the mass flow measuring apparatus during its construction or assembly.

Figure 4D:
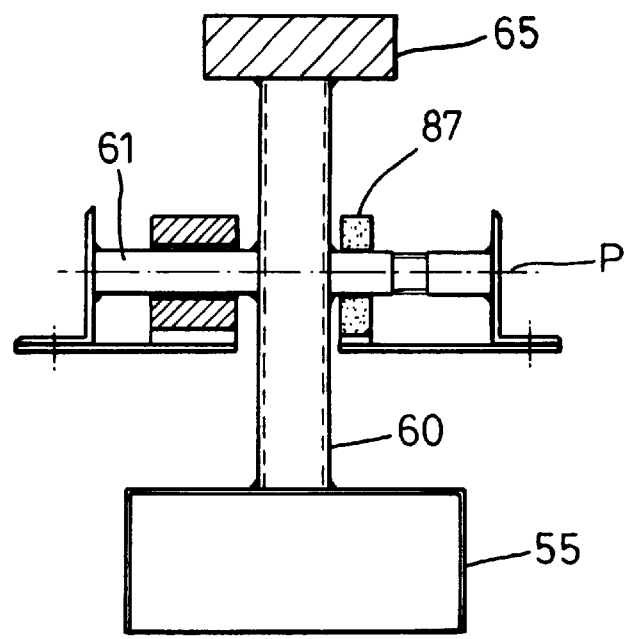

A further possibility is shown in FIG. 4d, in which an annular coil extends about shaft 61 the motor effect of which applies a known torque to shaft 61, thereby causing a deflection of sensor member 55 equivalent to a chosen mass flow rate. In this embodiment shaft 61 inside the annulus of coil 87 is of asymmetric cross section so that the coil torque tends to rotate the shaft.

Yet a further possibility is to dispense with the coils and springs entirely and to apply a known weight temporarily, e.g. at the point C shown in FIG. 4a in order cause a known deflection that can be used for calibration purposes.

It will be obvious to those skilled in the art that various changes may be made without departing from the scope of the invention is not to be considered limited to what is illustrated in the drawings and described in the specification.

What is claimed is:

1. A mass flow measuring apparatus for a bulk material comprising a sensor member having a surface permitting movement thereon of the mass of bulk material to generate a force in dependence on the mass of bulk material moving on the sensor member per unit time; and a signal generator operably connected to the sensor for generating a measurement signal indicative of the force, a means for compensating for an effect on a magnitude of the force of an inclination of the surface relative to predetermined orientation, wherein the surface is mounted for pivoting movement in the apparatus about a centre of mass of the sensor member, and the means for compensating for the effects of inclination includes means for displacing the centre of gravity of the sensor member from a pivot axis.

2. The mass flow measuring apparatus according to claim 1 wherein the means for displacing the centre of gravity includes a mass secured to exert a moment on the surface whereby to attenuate the effects on the measurement signal of inclination of the surface.

3. The mass flow measuring apparatus according to claim 2 including an adjuster for adjusting a position of the mass in dependence on an angle of inclination of the surface.

4. A combine harvester including a mass flow measuring apparatus according to claim 3.

5. The combine harvester according to claim 4 wherein the direction of inclination of the surface aligns generally with the direction of forward and reverse movement of the combine harvester.

* * * * *